United States Patent
Mano (10) Patent No.: US 12,512,121 B2
(45) Date of Patent: Dec. 30, 2025

(54) PREAMPLIFIER, DISK DEVICE, CONTROL DEVICE, AND ANALYSIS METHOD

(71) Applicants: Kabushiki Kaisha Toshiba, Tokyo (JP); Toshiba Electronic Devices & Storage Corporation, Tokyo (JP)

(72) Inventor: Kazunori Mano, Tokyo (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 19/046,244

(22) Filed: Feb. 5, 2025

(65) Prior Publication Data

US 2025/0378848 A1 Dec. 11, 2025

(30) Foreign Application Priority Data

Jun. 7, 2024 (JP) ................... 2024-093187

(51) Int. Cl.
| | |
|---|---|
| *G11B 5/02* | (2006.01) |
| *G11B 5/09* | (2006.01) |
| *G11B 5/455* | (2006.01) |
| *H03F 3/04* | (2006.01) |
| *G11B 5/60* | (2006.01) |

(52) U.S. Cl.
CPC ............. *G11B 5/455* (2013.01); *G11B 5/09* (2013.01); *H03F 3/04* (2013.01); *G11B 5/607* (2013.01); *G11B 5/6076* (2013.01)

(58) Field of Classification Search
CPC .. G11B 20/18; G11B 5/09; G11B 5/02; G11B 20/100027
USPC ........................................................ 360/68
See application file for complete search history.

(56) References Cited

U.S. PATENT DOCUMENTS

| | | | |
|---|---|---|---|
| 8,077,415 B1 | 12/2011 | Sutardja | |
| 10,242,708 B2 * | 3/2019 | Yamasaki | ............. H05K 1/028 |
| 2012/0262812 A1 | 10/2012 | McGuire et al. | |

FOREIGN PATENT DOCUMENTS

JP S59-116867 A 7/1984

* cited by examiner

*Primary Examiner* — Nabil Z Hindi
(74) *Attorney, Agent, or Firm* — Kim & Stewart LLP (57) ABSTRACT

A preamplifier is included in a head assembly of a disk device. The preamplifier includes: an abnormality detecting circuit connected to a structural element included in a head device of the head assembly; a reference resistance element having a resistance value corresponding to the resistance value of the structural element and connected to the abnormality detecting circuit; and a switching circuit switchable to a first state and a second state. The first state is a state in which the abnormality detecting circuit and the structural element are connected to each other, and the abnormality detecting circuit and the reference resistance element are disconnected. The second state is a state in which the abnormality detecting circuit and the reference resistance element are connected to each other, and the abnormality detecting circuit and the structural element are disconnected.

14 Claims, 7 Drawing Sheets

PREAMPLIFIER, DISK DEVICE, CONTROL DEVICE, AND ANALYSIS METHOD

CROSS-REFERENCE TO RELATED APPLICATION

This application is based upon and claims the benefit of priority from Japanese Patent Application No. 2024-093187, filed on Jun. 7, 2024; the entire contents of which are incorporated herein by reference.

FIELD

Embodiments described herein relate generally to a preamplifier, a disk device, a control device, and an analysis method.

BACKGROUND

Preamplifiers included in head assemblies of disk devices are known. Such preamplifiers may have an abnormality detecting circuit used for detecting an abnormality of a structural element of a head device. In a case in which the abnormality detecting circuit has detected an abnormality, there may be a case in which this abnormality is not an abnormality of the structural element of the head device but an abnormality of the abnormality detecting circuit. Since a preamplifier is included in a head assembly arranged inside a disk device, conventionally, in order to analyze which one of a structural element of a head device and an abnormality detecting circuit has an abnormality, there is a need to decompose the disk device and the like. Thus, there is a problem that the number of processes required for the analysis of an abnormality detected in the preamplifier is increased.

DETAILED DESCRIPTION

A preamplifier according to embodiments is a preamplifier included in a head assembly of a disk device. The preamplifier includes: an abnormality detecting circuit connected to a structural element included in a head device of the head assembly; a reference resistance element having a resistance value corresponding to the resistance value of the structural element and connected to the abnormality detecting circuit; and a switching circuit switchable to a first state and a second state. The first state is a state in which the abnormality detecting circuit and the structural element are connected to each other, and the abnormality detecting circuit and the reference resistance element are disconnected. The second state is a state in which the abnormality detecting circuit and the reference resistance element are connected to each other, and the abnormality detecting circuit and the structural element are disconnected.

Hereinafter, a preamplifier, a disk device, a control device, and an analysis method according to embodiments will be described with reference to the drawings.

FIRST EMBODIMENT

Figure 1:
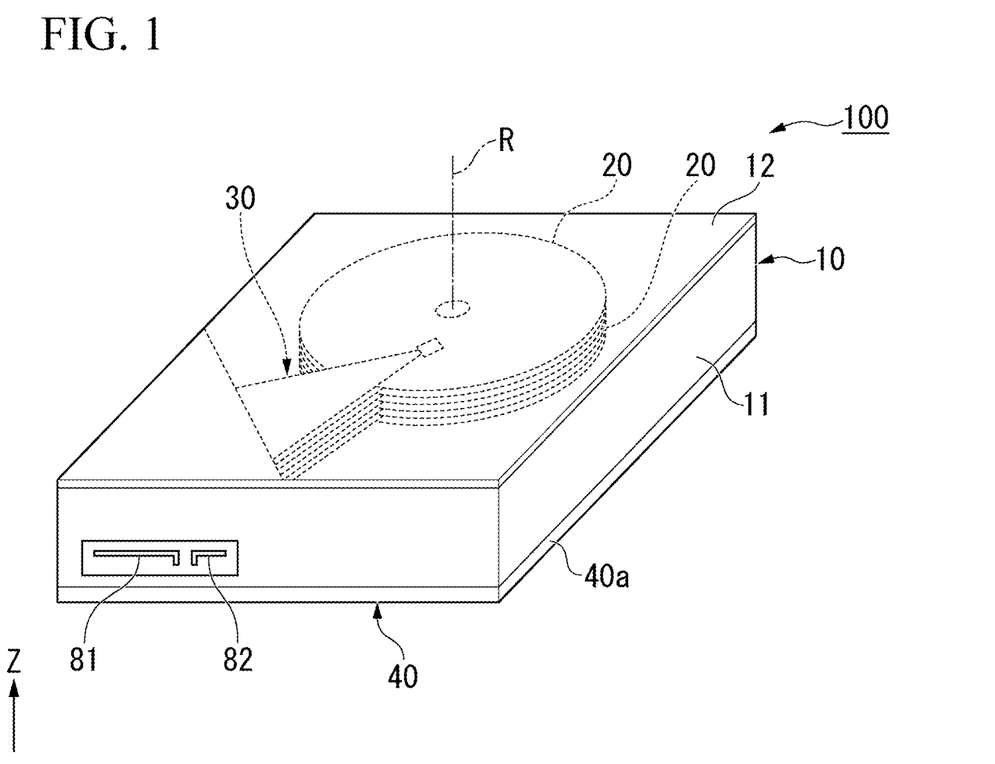
FIG. 1 is a perspective view illustrating a disk device according to a first embodiment.
Figure 2:
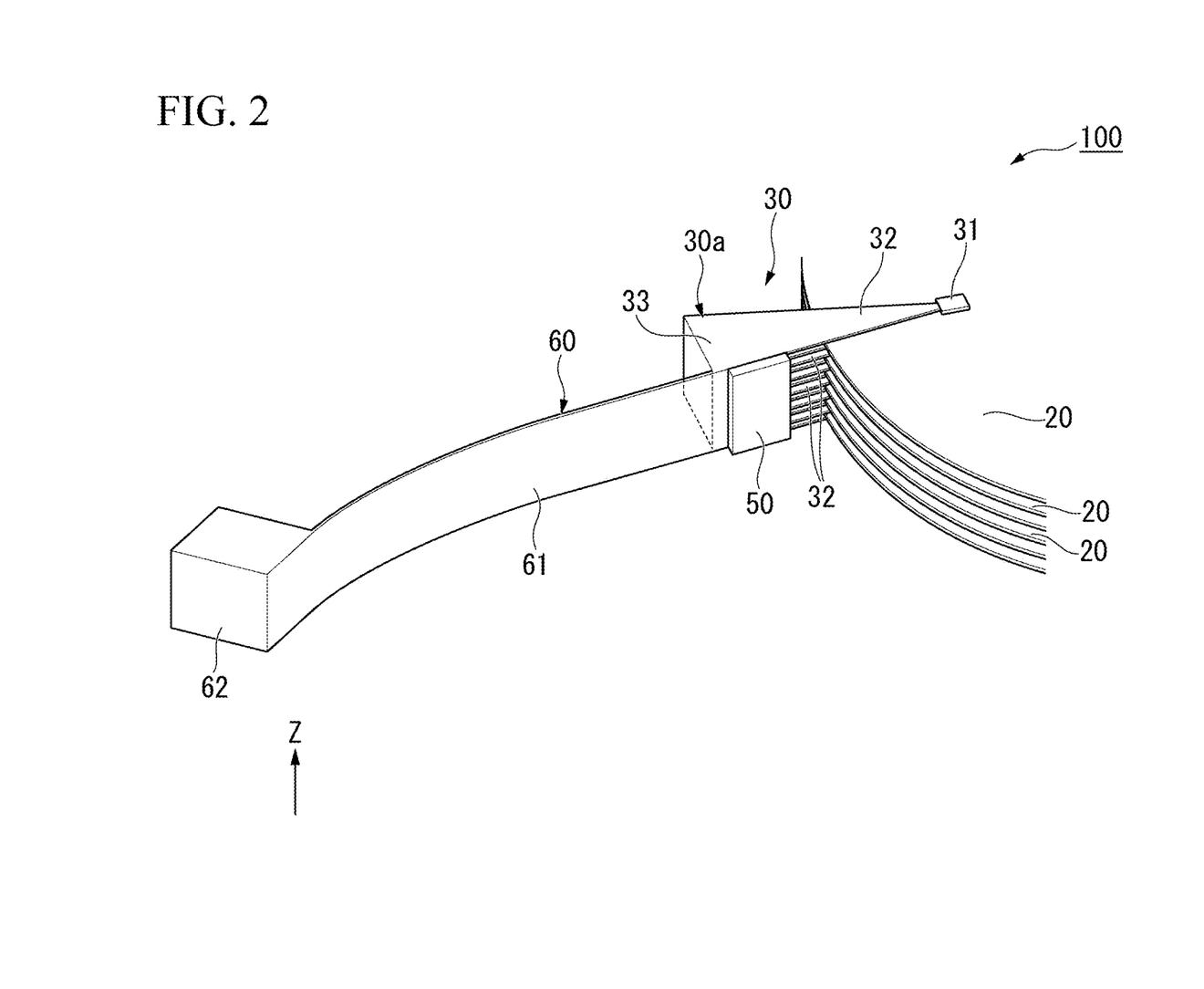
FIG. 2 is a perspective view illustrating a part of the disk device according to the first embodiment.
Figure 3:
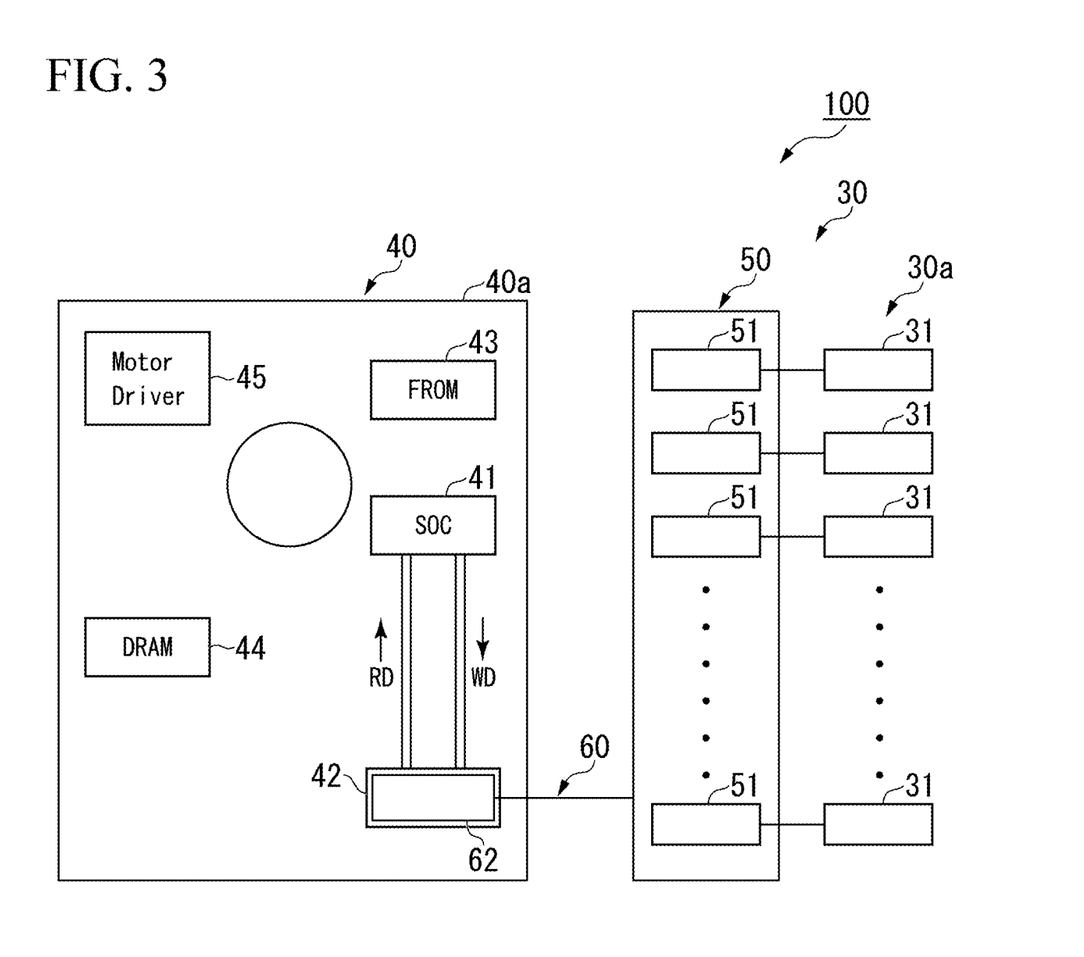
FIG. 3 is a block diagram illustrating a part of the disk device according to the first embodiment.

FIG. 1 is a perspective view illustrating a disk device 100 according to a first embodiment. FIG. 2 is a perspective view illustrating a part of the disk device 100 according to the first embodiment. FIG. 3 is a block diagram illustrating a part of the disk device 100 according to the first embodiment. A Z-axis direction illustrated in FIGS. 1 and 2 is a direction that is parallel to a rotation axis line R of a disk 20 to be described below. In the following description, a direction parallel to the Z-axis direction will be referred to as an "axial direction", a side (+Z side) to which an arrow of a Z axis among axial directions is directed will be referred to as an "upper side", and a side (−Z side) opposite to a side to which the arrow of the Z axis among axial directions is directed will be referred to as a "lower side". The upper side and the lower side are merely terms for describing arrangement relations and the like of units, and actual arrangement relations and the like may be arrangement relations and the like other than the arrangement relations and the like represented by such terms.

The disk device 100 according to the first embodiment illustrated in FIGS. 1 to 3 is a magnetic disk device having a hard disk drive built thereinto. The disk device 100 can store information as digital data. The disk device 100 is driven on the basis of an instruction from a host device not illustrated in the drawing. The host device not illustrated in the drawing is, for example, a personal computer or the like. The host device not illustrated in the drawing is not particularly limited as long as it is a device giving an instruction to the disk device 100. The host device not illustrated in the drawing can record information in the disk device 100 and read data recorded in the disk device 100.

As illustrated in FIG. 1, the disk device 100 includes a casing 10, a disk 20, a head assembly 30, a control device 40, a power supply terminal 81, and a connection terminal 82. The casing 10 houses the disk 20 and the head assembly 30 inside. In the first embodiment, the casing 10 has a parallelepiped box shape. The casing 10 has a casing main body 11 and a lid body 12. The casing main body 11 has a parallelepiped box shape that is open on the upper side. Inside the casing main body 11, the disk 20 and the head assembly 30 are housed. The lid body 12 is fixed to an end portion of the upper side of the casing main body 11. The lid body 12 closes an opening of the upper side of the casing main body 11.

In the first embodiment, the disk 20 is a magnetic disk. The disk 20 has a disc shape. The disk 20 is rotated around a rotation axis line R extending in the axial direction by a spindle motor not illustrated in the drawing. The disk 20 has a recording surface on which digital data is recorded. In the first embodiment, a plurality of disks 20 are disposed with spacing in the axial direction. The number of disks 20 is not particularly limited as long as it is one or more.

The control device 40 is a device that controls the disk device 100. The control device 40 is mounted on an outer face of the casing 10. In the first embodiment, the control device 40 is mounted on a face of the lower side of the casing 10. For example, at least a part of the control device 40 is exposed to the outside of the casing 10. As illustrated in FIG. 3, the control device 40 has a circuit board 40a, a controller 41, a connector part 42, a nonvolatile memory 43, a volatile memory 44, and a motor driver IC 45. The circuit board 40a is a printed circuit board (PCB). In the circuit board 40a, the controller 41, the connector part 42, the nonvolatile memory 43, the volatile memory 44, and the motor driver IC 45 are mounted.

The controller 41 is a system controller that controls the disk device 100. The controller 41, for example, is a Large Scale Integration (LSI) called a System-on-a-Chip (SoC) in which a plurality of elements such as microprocessors are integrated in a single chip. The controller 41 is electrically connected to the nonvolatile memory 43, the volatile memory 44, the motor driver IC 45, and the connector part 42. A connector part 62 of a Flexible Print Circuit (FPC) board 60 to be described below is connected to the connector part 42. The controller 41 is electrically connected to the preamplifier 50 by the FPC board 60. The control device 40 controls the preamplifier 50 using the controller 41.

The nonvolatile memory 43 is a semiconductor memory that continues to store recorded data even when power supply is cut off. In the first embodiment, the nonvolatile memory 43 is a flash memory. The nonvolatile memory 43, for example, is a flash memory of a NOR type or a NAND type. In the nonvolatile memory 43, for example, at least a part of a program used for driving the disk device 100, data that is necessary before data is read/written from/into the disk 20, and the like are recorded.

The volatile memory 44 is a semiconductor memory in which stored data disappears when power supply is cut off. In the first embodiment, the volatile memory 44 is a Dynamic Random Access Memory (DRAM). The volatile memory 44 may be an SRAM, a Synchronous Dynamic Random Access Memory (SDRAM), a Ferroelectric Random Access Memory (FeRAM), a Magnetoresistive Random Access Memory (MRAM), or the like.

The motor driver IC 45 controls driving of a spindle motor not illustrated in the drawing and driving of a voice coil motor not illustrated in the drawing on the basis of an instruction from the controller 41. The spindle motor not illustrated in the drawing rotates the disk 20 around the rotation axis line R. The voice coil motor not illustrated in the drawing moves a head device 31 to be described below.

As illustrated in FIG. 1, the power supply terminal 81 and the connection terminal 82 are exposed to the outside of the casing 10. In the first embodiment, the power supply terminal 81 and the connection terminal 82 are exposed to a side face of the casing main body 11. The power supply terminal 81 and the connection terminal 82 are electrically connected to the control device 40. A power supply cable not illustrated in the drawing is connected to the power supply terminal 81. This power supply cable, for example, is connected to a host device not illustrated in the drawing. Power is supplied to the disk device 100 from a host device through a power cable and the power supply terminal 81. A connection cable not illustrated in the drawing is connected to the connection terminal 82. This connection cable is connected to a host device. An instruction signal from a host device is input to the control device 40 through this connection cable and the connection terminal 82. In addition, an output signal from the control device 40 is input to the host device through this connection cable and the connection terminal 82.

In the first embodiment, the head assembly 30 is a Head Stack Assembly (HSA) having a plurality of head devices 31. As illustrated in FIG. 2, the head assembly 30 has a head assembly main body 30a, a preamplifier 50, and a FPC board 60. The head assembly main body 30a has a head device 31, an arm 32, and a base part 33. The arm 32 extends from the base part 33 in a direction that is orthogonal to the axial direction. In the first embodiment, a plurality of arms 32 are disposed to be aligned in the axial direction. In each of tip end parts of the plurality of arms 32, the head device 31 is disposed. The plurality of arms 32 are able to rotate around an axial line extending in the axial direction. The plurality of arms 32 are rotated around the axial line extending in the axial direction by a voice coil motor not illustrated in the drawing. Each head device 31 disposed in the tip end part of each arm 32 is moved to a position facing the recording surface of each disk 20 and a position not facing the recording surface of each disk 20 in accordance with each arm 32 being rotated around the axial line extending in the axial direction by a voice coil motor not illustrated in the drawing.

Figure 4:
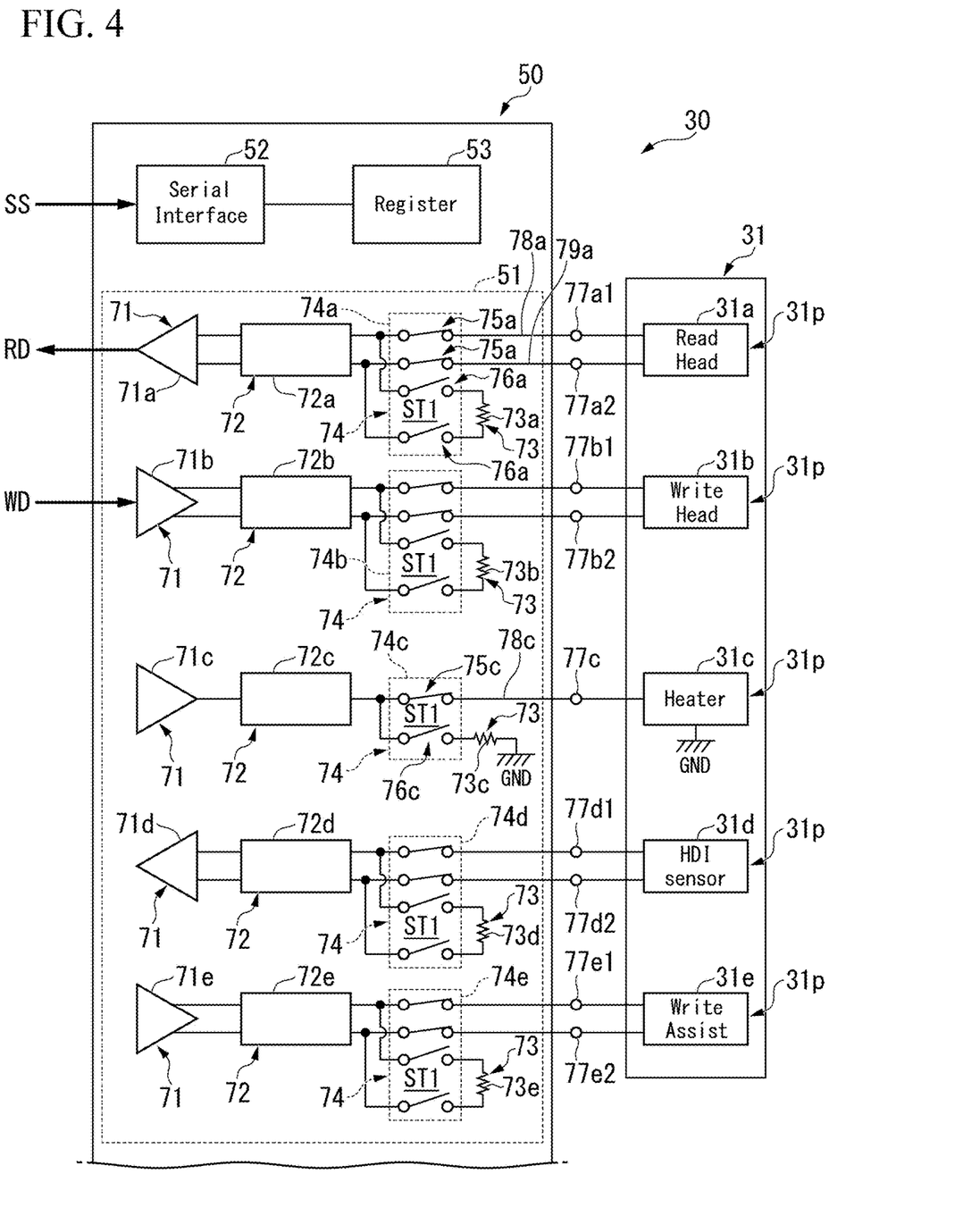
FIG. 4 is a block diagram illustrating a part of a head assembly according to the first embodiment.

The head device 31 is a magnetic head device that is able to read data recorded in the disk 20 and write data into the disk 20. At a position facing the recording surface of the disk 20, the head device 31 is able to read data from the recording surface of the disk 20 and write data into the recording surface of the disk 20. FIG. 4 is a block diagram illustrating a part of the head assembly 30. As illustrated in FIG. 4, each head device 31 has a plurality of structural elements 31p. The plurality of structural elements 31p include a read head 31a, a write head 31b, a heater 31c, a sensor 31d, and an assist element 31e.

The read head 31a is an structural element 31p that reads data recorded in the disk 20. The write head 31b is an structural element 31p that writes data into the disk 20. The heater 31c is an structural element 31p that is able to adjust a distance between the disk 20 and the head device 31. The heater 31c is able to adjust the distance between the disk 20 and the head device 31 by applying heat to the head device 31 to cause thermal expansion thereof. Although not illustrated, in each head device 31, for example, two structural elements 31p including a heater 31c applying heat to the read head 31a and a heater 31c applying heat to the write head 31b are included. The sensor 31d is an structural element 31p that is able to detect a contact between the disk 20 and the head device 31. The sensor 31d is a Head Disk Interface (HDI) sensor. The assist element 31e is an structural element 31p that assists writing of data into the disk 20. The assist element 31e, for example, is an assist element of a Microwave Assisted Magnetic Recording (MAMR) type. The assist element 31e, for example, may be an assist element 31e of a Heat Assisted Magnetic Recording (HAMR) type.

The FPC board 60 connects the circuit board 40a and the head assembly main body 30a to each other. As illustrated in FIG. 2, the FPC board 60 has a FPC board main body part 61 and a connector part 62. The FPC board main body part 61 extends from the connector part 62 and is connected to the head assembly main body 30a. The FPC board main body part 61 has a part attached to a base part 33 and parts attached to side faces of the plurality of arms 32. The FPC board main body part 61 is electrically connected to each of the head devices 31 disposed in the tip end parts of the plurality of arms 32.

The preamplifier 50 is mounted in the FPC board 60. In more detail, the preamplifier 50 is mounted in a part of the FPC board main body part 61 that is mounted in the base part 33. The preamplifier 50 is mounted in the base part 33 through the FPC board 60. The preamplifier 50 is electrically connected to the controller 41 through a wiring pattern disposed in the FPC board main body part 61 and a wiring pattern disposed in the circuit board 40a. The preamplifier 50 is electrically connected to each head device 31 through a wiring pattern disposed on a side face of each arm 32 in the FPC board main body part 61.

As illustrated in FIG. 3, the preamplifier 50 has a plurality of head driving circuits 51 driving the plurality of head devices 31 respectively. As illustrated in FIG. 4, each head driving circuit 51 has a circuit 71, an abnormality detecting circuit 72, a reference resistance element 73, and a switching circuit 74. The circuit 71, the abnormality detecting circuit 72, the reference resistance element 73, and the switching circuit 74 are disposed for each of the plurality of the structural elements 31p.

Each circuit 71 is a circuit that is connected to each structural element 31p. The plurality of circuits 71 include a circuit 71a connected to the read head 31a, a circuit 71b connected to the write head 31b, a circuit 71c connected to the heater 31c, a circuit 71d connected to the sensor 31d, and a circuit 71e connected to the assist element 31e.

The circuit 71a connected to the read head 31a is a circuit that amplifies a signal of data read by the read head 31a from the disk 20 and outputs the amplified signal as read data RD. The read data RD output from the circuit 71a, as illustrated in FIG. 3, is transmitted to the circuit board 40a through the FPC board 60 and is input to the controller 41. As illustrated in FIG. 4, the circuit 71a is connected to the read head 31a through one pair of terminals 77a1 and 77a2 disposed in the preamplifier 50. One of the one pair of terminals 77a1 and 77a2 is a positive terminal, and the other thereof is a negative terminal. The one pair of terminals 77a1 and 77a2 are respectively connected to the positive terminal and the negative terminal of the read head 31a through wirings of the FPC board main body part 61.

The circuit 71b connected to the write head 31b is a driver circuit that drives the write head 31b. The circuit 71b outputs a write current corresponding to write data WD transmitted from the controller 41 to the write head 31b. The write data WD is input from the controller 41 to the preamplifier 50 through the FPC board 60. The circuit 71b is connected to the write head 31b through one pair of terminals 77b1 and 77b2. One of the one pair of terminals 77b1 and 77b2 is a positive terminal, and the other thereof is a negative terminal. The one pair of terminals 77b1 and 77b2 are respectively connected to the positive terminal and the negative terminal of the write head 31b through wirings of the FPC board main body part 61.

The circuit 71c connected to the heater 31c is a driver circuit that drives the heater 31c on the basis of a signal from the controller 41. The circuit 71c is connected to the heater 31c through the terminal 77c. The terminal 77c is connected to the terminal of the heater 31c through a wiring of the FPC board main body part 61. The heater 31c is connected to the ground GND inside the head device 31.

The circuit 71d connected to the sensor 31d is a circuit that amplifies a detection signal of the sensor 31d detecting a contact between the head device 31 and the disk 20 and outputs the amplified detection signal. The circuit 71d is connected to the sensor 31d through one pair of terminals 77d1 and 77d2. One of the one pair of terminals 77d1 and 77d2 is a positive terminal, and the other thereof is a negative terminal. The one pair of terminals 77d1 and 77d2 are respectively connected to a positive terminal and a negative terminal of the sensor 31d through wirings of the FPC board main body part 61.

The circuit 71e connected to the assist element 31e is a driver circuit that drives the assist element 31e. The circuit 71e is connected to the assist element 31e through one pair of terminals 77e1 and 77e2. One of the one pair of terminals 77e1 and 77e2 is a positive terminal, and the other thereof is a negative terminal. The one pair of terminals 77e1 and 77e2 are respectively connected to a positive terminal and a negative terminal of the assist element 31e through wirings of the FPC board main body part 61.

Each abnormality detecting circuit 72 is a circuit that is used for detecting an abnormality of each structural element 31p. In a case in which a value of a current or a voltage that flows or is applied when each structural element 31p is driven is not a value within a predetermined range, each abnormality detecting circuit 72 performs predetermined output indicating that an abnormality has been detected. A current that flows when each structural element 31p is driven, for example, is a current flowing between each circuit 71 and each structural element 31p. A voltage that is applied when each structural element 31p is driven, for example, is a voltage applied to one place between the terminal of the preamplifier 50 to which each structural element 31p is connected and each circuit 71. The value of the current or the voltage that flows or is applied when each structural element 31p is driven becomes not a value within a predetermined range, for example, in a case in which a part of the circuit is shorted, a case in which a part of the circuit is cut off, and the like.

A predetermined output, which indicates that an abnormality has been detected, output from the abnormality detecting circuit 72 is, for example, a fault signal indicating that an abnormality has occurred in the structural element 31p. The fault signal is output from a fault terminal disposed in the preamplifier 50 and is input to the controller 41. For example, the fault signal becomes one of high and low at a normal time and becomes the other of high and low in a case in which the abnormality detecting circuit 72 has detected an abnormality. For example, in a case in which the fault signal is high at the normal time, when an abnormality is detected, the abnormality detecting circuit 72 sets the fault signal to low. In a case in which an abnormality has been detected by at least one abnormality detecting circuit 72 among the plurality of abnormality detecting circuits 72, the fault signal output from the fault terminal comes into a state that indicates an abnormality.

In the first embodiment, each abnormality detecting circuit 72 is disposed between terminals connected to one structural element 31p and one circuit 71. In the circuit according to the present disclosure, "a certain element is disposed between another element and yet another element" means that this certain element is disposed on a circuit reaching from one of this another element or this yet another element to the other thereof. Each abnormality detecting circuit 72 is connected to one circuit 71 and one structural element 31p. the plurality of abnormality detecting circuits 72 include an abnormality detecting circuit 72a connected to the read head 31a, an abnormality detecting circuit 72b connected to the write head 31b, an abnormality detecting circuit 72c connected to the heater 31c, an abnormality detecting circuit 72d connected to the sensor 31d, and an abnormality detecting circuit 72e connected to the assist element 31e.

Each reference resistance element 73 is a resistance element having a resistance value corresponding to the resistance value of one structural element 31p. A resistance value corresponding to the resistance value of the structural element 31p includes the same resistance value as the resistance value of the structural element 31p, a resistance value that is approximately the same as the resistance value of the structural element 31p, and a resistance value within a standard range of the resistance value of the structural element 31p. A resistance value corresponding to the resistance value of the structural element 31p is a resistance value within a range for which the abnormality detecting circuit 72 does not detect an abnormality even when the structural element 31p is replaced with the reference resistance element 73 in a case in which the abnormality detecting circuit 72 is normal. In other words, the resistance value corresponding to the resistance value of the structural element 31p is a resistance value for which the value of the current or the voltage used by the abnormality detecting circuit 72 in determination of an abnormality becomes a value within the predetermined range described above even when the structural element 31p is replaced with the reference resistance element 73 in a case in which the abnormality detecting circuit 72 is normal.

Each reference resistance element 73 is connected to each abnormality detecting circuit 72. A plurality of reference resistance elements 73 include a reference resistance element 73a connected to the abnormality detecting circuit 72a, a reference resistance element 73b connected to the abnormality detecting circuit 72b, a reference resistance element 73c connected to the abnormality detecting circuit 72c, a reference resistance element 73d connected to the abnormality detecting circuit 72d, and a reference resistance element 73e connected to the abnormality detecting circuit 72e.

The reference resistance element 73a is disposed between a wiring 78a connecting a terminal 77a1 connected to the read head 31a and the abnormality detecting circuit 72a and a wiring 79a connecting the terminal 77a2 and the abnormality detecting circuit 72a. One end of the reference resistance element 73a is connected to the wiring 78a. The other end of the reference resistance element 73a is connected to the wiring 79a.

The reference resistance element 73b is connected similar to the reference resistance element 73a except that the abnormality detecting circuit 72 and the structural element 31p that are connected are different. The reference resistance element 73d is connected similar to the reference resistance element 73a except that the abnormality detecting circuit 72 and the structural element 31p that are connected are different. The reference resistance element 73e is connected similar to the reference resistance element 73a except that the abnormality detecting circuit 72 and the structural element 31p that are connected are different.

The reference resistance element 73c is disposed between a wiring 78c connecting the terminal 77c and the abnormality detecting circuit 72c and the ground GND of the preamplifier 50. One end of the reference resistance element 73c is connected to the wiring 78c. The other end of the reference resistance element 73c is connected to the ground GND of the preamplifier 50. The ground GND of the preamplifier 50 and the ground GND of the head device 31 are common grounds having the same reference electric potential. The ground GND of the preamplifier 50 and the ground GND of the head device 31 are connected to the ground of the circuit board 40a through a ground wiring pattern, which is not illustrated in the drawing, disposed in the FPC board 60. The ground of the controller 41 is connected to the ground of the circuit board 40a. In other words, in the first embodiment, the reference electric potential of the ground GND of the preamplifier 50 and the reference electric potential of the ground GND of the head device 31 are the same as the reference electric potential of the ground of the controller 41.

Each switching circuit 74 is a switching circuit that is switchable to a first state ST1 and a second state ST2. The first state ST1 is a state in which the abnormality detecting circuit 72 and the structural element 31p are connected, and the abnormality detecting circuit 72 and the reference resistance element 73 are disconnected. The second state ST2 is a state in which the abnormality detecting circuit 72 and the reference resistance element 73 are connected, and the abnormality detecting circuit 72 and the structural element 31p are disconnected. Each switching circuit 74 is maintained to the first state ST1 while the disk device 100 is normally used. Each switching circuit 74 is disposed between the terminal of the preamplifier 50 to which each structural element 31p is connected and each abnormality detecting circuit 72.

A plurality of switching circuit 74 include switching circuit 74a to 74e. The switching circuit 74a is disposed between the terminals 77a1 and 77a2 to which the read head 31a is connected and the abnormality detecting circuit 72a. The switching circuit 74b is disposed between the terminals 77b1 and 77b2 to which the write head 31b is connected and the abnormality detecting circuit 72b. The switching circuit 74c is disposed between the terminal 77c to which the heater 31c is connected and the abnormality detecting circuit 72c. The switching circuit 74d is disposed between the terminals 77d1 and 77d2 to which the sensor 31d is connected and the abnormality detecting circuit 72d. The switching circuit 74e is disposed between the terminals 77e1 and 77e2 to which the assist element 31e is connected and the abnormality detecting circuit 72e.

In the first embodiment, the switching circuit 74a includes one pair of switching elements 75a and one pair of switching elements 76a. The one pair of switching elements 75a are respectively disposed in the one pair of the wirings 78a and 79a. The one pair of switching elements 76a are respectively disposed in a wiring connecting the wiring 78a and one end of the reference resistance element 73a and a wiring connecting the wiring 79a and the other end of the reference resistance element 73a. Each of the switching elements 75a and 76a, for example, is a transistor such as a field effect transistor (FET). Each of the switching elements 75a and 76a is switched between an on state and an off state. The switching elements 75a and 76a respectively disconnect wirings in which the switching elements 75a and 76a are disposed in the off state.

The one pair of switching elements 75a are driven together in association with each other. The on/off states of the one pair of switching elements 75a are the same. The one pair of switching elements 76a are driven together in association with each other. The on/off states of the one pair of switching elements 76a are the same. The on/off states of the one pair of switching elements 76a are states opposite to the on/off states of the one pair of switching elements 75a. In other words, in a case in which the one pair of switching elements 76a are in the on state, the one pair of switching elements 75a are in the off state. In a case in which the one pair of switching elements 76a are in the off state, the one pair of switching elements 75a are in the on state.

Figure 5:
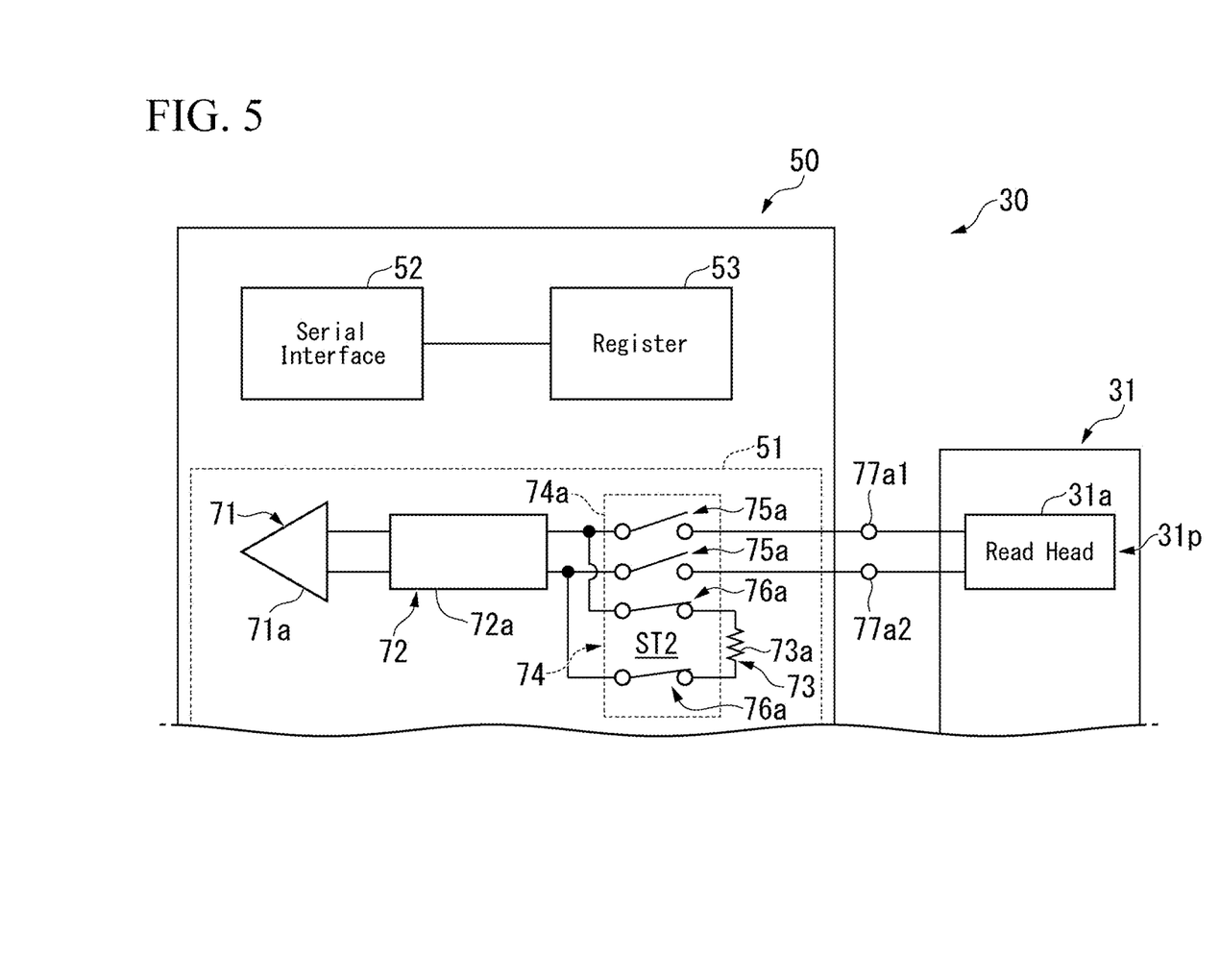
FIG. 5 is a diagram illustrating a case in which a switching circuit according to the first embodiment is in a second state.

In a case in which the one pair of switching elements 75a are in the on state, the abnormality detecting circuit 72a and the read head 31a are connected to each other. In a case in which the one pair of switching elements 75a are in the off state, the abnormality detecting circuit 72a and the read head 31a are disconnected. In a case in which the one pair of switching elements 76a are in the on state, the abnormality detecting circuit 72a and the reference resistance element 73a are connected to each other. In a case in which the one pair of switching elements 76a are in the off state, the abnormality detecting circuit 72a and the reference resistance element 73a are disconnected. In a case in which the one pair of switching elements 75a are in the on state, and the one pair of switching elements 76a are in the off state, the switching circuit 74a comes into the first state ST1. In a case in which the one pair of switching elements 75a are in the off state, and the one pair of switching elements 76a are in the on state, the switching circuit 74a comes into the second state ST2. FIG. 4 illustrates a case in which the switching circuit 74a is in the first state ST1. FIG. 5 illustrates a case in which the switching circuit 74a is in the second state ST2.

The switching circuit 74b has a configuration similar to the switching circuit 74a except that the connected abnormality detecting circuit 72 is different. The switching circuit 74d has a configuration similar to the switching circuit 74a except that the connected abnormality detecting circuit 72 is different. The switching circuit 74e has a configuration similar to the switching circuit 74a except that the connected abnormality detecting circuit 72 is different.

In the first embodiment, the switching circuit 74c has a switching element 75c and a switching element 76c. The switching element 75c is disposed in the wiring 78c. The switching element 76c is disposed in a wiring connecting the wiring 78c and one end of the reference resistance element 73c. The switching elements 75c and 76c are respectively similar to the switching elements 75a and 76a described above.

The preamplifier 50 has an interface part 52 and a register 53. The register 53 is a storage unit that stores data relating to the state of the preamplifier 50. Data representing the state of the abnormality detecting circuit 72 is stored in the register 53 for each of the plurality of abnormality detecting circuits 72. The data representing the state of the abnormality detecting circuit 72 is data that indicates whether or not the abnormality detecting circuit 72 has detected an abnormality.

Data representing whether the switching circuit 74 is set to the first state ST1 or the second state ST2 is stored in the register 53. For example, data representing whether the state is set to the first state ST1 or the second state ST2 for each of the plurality of switching circuit 74 is stored in the register 53.

The interface part 52 is able to communicate with the controller 41 through the FPC board 60. In the first embodiment, the interface part 52 is able to perform serial communication with the controller 41. A serial signal SS transmitted from the controller 41 through the FPC board 60 is input to the interface part 52. The interface part 52 is connected to the register 53. The interface part 52 outputs data stored in the register 53 to the controller 41 on the basis of a received serial signal SS. For example, in a case in which the received serial signal SS is a signal for outputting data representing the state of the abnormality detecting circuit 72, the interface part 52 outputs the data representing the state of the abnormality detecting circuit 72 to the controller 41.

The interface part 52 rewrites data of the register 53 on the basis of a received serial signal SS. For example, in a case in which the received serial signal SS is a signal for switching that state of a certain switching circuit 74 to the second state ST2, the interface part 52 rewrites data of a corresponding part of the register 53 with data for setting the state of this certain switching circuit 74 to the second state ST2. In accordance with this, the state of this certain switching circuit 74 can be switched to the second state ST2.

Figure 6:
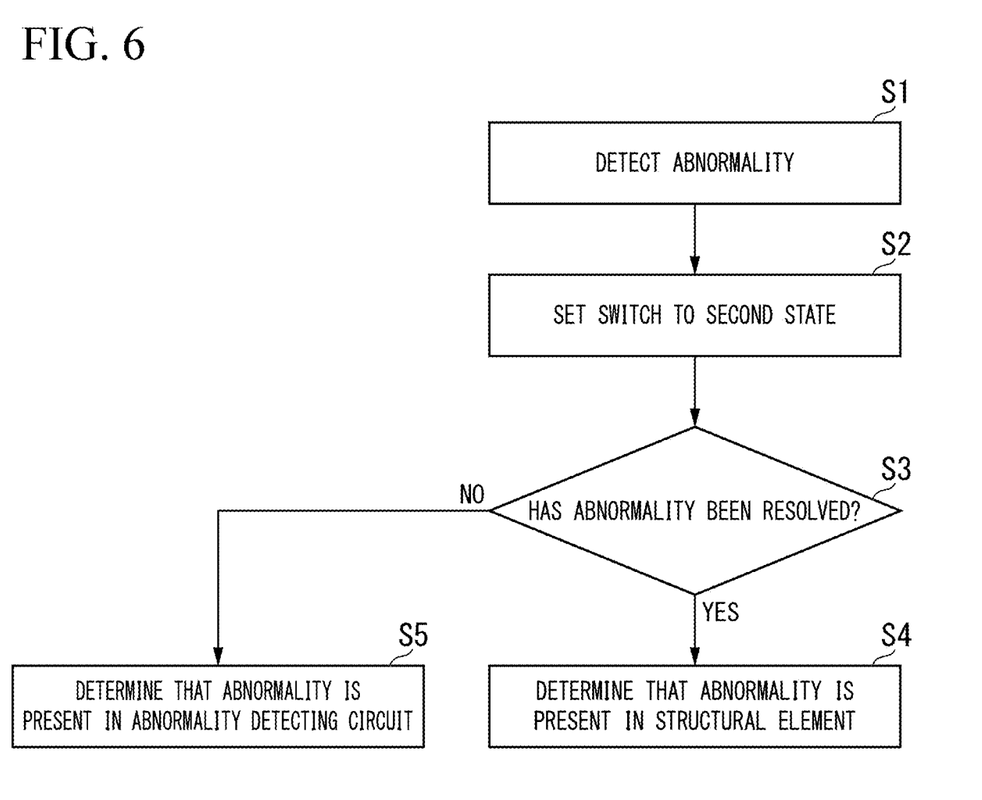
FIG. 6 is a flowchart illustrating one example of the sequence of an analysis method according to the first embodiment.

FIG. 6 is a flowchart illustrating one example of the sequence of an analysis method according to the first embodiment. The analysis method according to the first embodiment includes analysis of an abnormality detected by the preamplifier 50 included in the head assembly 30. As illustrated in FIG. 6, the analysis method according to the first embodiment includes a step S1 of detecting an abnormality, a step S2 of setting the switching circuit 74 to the second state ST2, a step S3 of determining whether or not the abnormality has been resolved, a step S4 of determining that an abnormality is present in the structural element 31p, and a step S5 of determining that an abnormality is present in the abnormality detecting circuit 72.

In Step S1, an abnormality is detected using the abnormality detecting circuits 72. When at least one of the plurality of abnormality detecting circuits 72 detects an abnormality, a fault signal output from the preamplifier 50 comes into a state indicating that an abnormality has been detected. The fault signal output from the preamplifier 50 is input to the controller 41. For this reason, the controller 41 determines that an abnormality has been detected by the preamplifier 50 on the basis of the input fault signal. In a case in which it is determined that an abnormality has been detected by the preamplifier 50, the controller 41 prohibits writing data into the disk 20, reading data from the disk 20, and the like and transmits a signal indicating that an abnormality has occurred to a host device not illustrated in the drawing.

An operator performing analysis in Step S2 according to the first embodiment transmits an instruction to the controller 41 and sets the switching circuit 74 to the second state ST2. For this reason, as illustrated in FIG. 5, the abnormality detecting circuit 72 is connected to the reference resistance element 73, and the abnormality detecting circuit 72 and the structural element 31p are disconnected. In this way, in the analysis method according to the first embodiment, the analysis of an abnormality detected by the preamplifier 50 includes switching of the switching circuit 74 to the second state ST2 in a case in which the abnormality detecting circuit 72 has detected an abnormality in a case in which the switching circuit 74 is in the first state ST1. In Step S2, an operator, for example, transmits an instruction to the controller 41 through a host device, which is not illustrated in the drawing, connected through a connection cable, which is not illustrated in the drawing, connected to the connection terminal 82.

An operator performing analysis in Step S3 according to the first embodiment checks a fault signal output to the controller 41 and determines whether or not an abnormality has been resolved. In Step S3, the operator checks a fault signal output to the controller 41 through a host device, not illustrated in the drawing, connected through a connection cable, which is not illustrated in the drawing, connected to the connection terminal 82. In a case in which the fault signal output to the controller 41 in Step S3 is a signal representing a normal state, the operator can determine that the abnormality has been resolved (Step S3: Yes). In a case in which the switching circuit 74 is in the second state ST2, the abnormality detecting circuit 72 is connected to not the structural element 31p but the reference resistance element 73. In accordance with an abnormality not being detected by the abnormality detecting circuit 72 in the second state ST2, the operator can determine that an abnormality is present in the structural element 31p connected to the abnormality detecting circuit 72 when the abnormality was detected (Step S4). In this way, according to the analysis method of the first embodiment, the analysis of an abnormality detected by the preamplifier 50 includes determining that an abnormality is present in the structural element 31p in a case in which the abnormality detecting circuit 72 has not detected an abnormality in a case in which the switching circuit 74 is in the second state ST2.

On the other hand, in a case in which the fault signal output to the controller 41 is maintained to be a signal indicating an abnormal state in Step S3, the operator can determine that the abnormality has not been resolved (Step S3: No). In accordance with the abnormality being continued to be detected by the abnormality detecting circuit 72 also in the second state ST2 in which the abnormality detecting circuit 72 is connected to not the structural element 31p but the reference resistance element 73, the operator can determine that the abnormality detected by the abnormality detecting circuit 72 in a case in which the switching circuit 74 is in the first state ST1 is an abnormality falsely detected, and the abnormality is present not in the structural element 31p but in the abnormality detecting circuit 72 (Step S5). In this way, in the analysis method according to the first embodiment, the analysis of an abnormality detected by the preamplifier 50 includes determining that an abnormality is present in the abnormality detecting circuit 72 in a case in which the abnormality detecting circuit 72 has detected an abnormality in a case in which the switching circuit 74 is in the second state ST2.

As above, an operator performing analysis can analyze whether an abnormality detected by the abnormality detecting circuit 72 is an abnormality that has occurred in the structural element 31p or an abnormality that has occurred in the abnormality detecting circuit 72. The operator performing analysis transmits an instruction to the preamplifier 50 through the controller 41 and reads data representing the state of the abnormality detecting circuit 72 that is stored in the register 53, thereby being able to identify a certain structural element 31p or a certain abnormality detecting circuit 72 in which the abnormality has occurred. The operation of reading this data from the register 53 may be performed in any stage in the analysis.

An operator performing analysis, for example, before performing Step S2, may transmit an instruction to the preamplifier 50 through the controller 41 and read data representing the state of the abnormality detecting circuit 72 that is stored in the register 53. In this case, the operator may set only the switching circuit 74 connected to the abnormality detecting circuit 72 that has detected an abnormality to the second state ST2 in Step S2. In addition, the operator may set all the switching circuit 74 to the second state ST2 in Step S2.

For example, in a case in which an abnormality detected by the control device 40 is to be analyzed, an operator performing analysis replaces a control device 40 mounted in the casing 10 from the outside with another control device 40 of which a normal operation has been checked. When the control device 40 continues to detect the abnormality in this state, the operator can determine that an abnormality is present in another device connected to the control device 40. In addition, when the control device 40 does not detect an abnormality in this state, the operator can determine that an abnormality is present in the control device 40 that has originally been mounted. In other words, when there is an abnormality detected in the control device 40 mounted in the casing 10 from the outside, the abnormality can be easily analyzed by only replacing the control device 40 from the outside of the disk device 100. In addition, another device connected to the control device 40, for example, is a voice coil motor, a spindle motor, or the like not illustrated in the drawing.

On the other hand, an abnormality detected by the preamplifier 50 included in the head assembly 30, conventionally, needs to be analyzed by extracting the head assembly 30 by detaching the lid body 12 of the casing 10. In other words, in order to analyze an abnormality detected by the preamplifier 50 disposed inside the disk device 100, it has been necessary to disassemble the disk device 100. In addition, in order to perform analysis of the structural element 31p, it has been necessary to perform observation of a connection state of the FPC board 60 and the terminal of the structural element 31p using a microscope, inspection of a resistance value of each structural element 31p, and the like. In addition, in order to perform analysis of the preamplifier 50, it has been necessary to perform isolation of a defective part by detaching the head device 31 from the FPC board 60 and performing inspection of checking the function of the single preamplifier 50. Thus, conventionally, there has been a problem that the number of processes required for analysis of an abnormality detected by the preamplifier 50 is increased.

In contrast to this, according to the first embodiment, the preamplifier 50 includes the abnormality detecting circuit 72 that is connected to the structural element 31p included in the head device 31 of the head assembly 30, the reference resistance element 73 that has a resistance value corresponding to the resistance value of the structural element 31p and is connected to the abnormality detecting circuit 72, and the switching circuit 74 that is switchable to the first state ST1 and the second state ST2. The first state ST1 is a state in which the abnormality detecting circuit 72 and the structural element 31p are connected to each other, and the abnormality detecting circuit 72 and the reference resistance element 73 are disconnected. The second state ST2 is a state in which the abnormality detecting circuit 72 and the reference resistance element 73 are connected to each other, and the abnormality detecting circuit 72 and the structural element 31p are disconnected. For this reason, as described above, in a case in which an abnormality has been detected by the abnormality detecting circuit 72, by switching the switching circuit 74 from the first state ST1 to the second state ST2, the abnormality detecting circuit 72 can be detached from the structural element 31p and be connected to the reference resistance element 73. By checking whether or not the abnormality is continued to be detected in this second state ST2, an operator performing analysis can easily determine whether a cause for detection of an abnormality is present in the structural element 31p or the abnormality detecting circuit 72. Thus, the operator can analyze the reason for the abnormality detected by the preamplifier 50 by only performing an operation for the control device 40 from the outside without disassembling the disk device 100. For this reason, the number of processes required for analysis of an abnormality detected by the preamplifier 50 can be reduced.

According to the first embodiment, the analysis method includes analyzing of an abnormality detected by the preamplifier 50. The analyzing of an abnormality includes switching the switching circuit 74 to the second state ST2 in a case in which the abnormality detecting circuit 72 has detected an abnormality in a case in which the switching circuit 74 is in the first state ST1. For this reason, an operator performing analysis, as described above, can easily determine whether a cause for detection of the abnormality is in the structural element 31p or the abnormality detecting circuit 72.

According to the first embodiment, the analyzing of an abnormality detected by the preamplifier 50 includes determining that an abnormality is present in the structural element 31p in a case in which the abnormality detecting circuit 72 has detected no abnormality in a case in which the switching circuit 74 is in the second state ST2 and determining that an abnormality is present in the abnormality detecting circuit 72 in a case in which the abnormality detecting circuit 72 has detected an abnormality in a case in which the switching circuit 74 is in the second state ST2. For this reason, an operator performing analysis can easily determine whether a cause for detection of the abnormality is in the structural element 31p or the abnormality detecting circuit 72.

According to the first embodiment, the disk device 100 includes the head assembly 30 having the preamplifier 50, the casing 10 housing the head assembly 30 inside, the control device 40 controlling the preamplifier 50, and the connection terminal 82 that is exposed to the outside of the casing 10 and is electrically connected to the control device 40. For this reason, an operator performing analysis can connect a connection cable not illustrated in the drawing to the connection terminal 82 from the outside of the disk device 100. The operator can connect the disk device 100 to a host device not illustrated in the drawing through this connection cable. In accordance with this, the operator can set the switching circuit 74 to the second state ST2 by transmitting an instruction from the host device to the control device 40 without disassembling the disk device 100. In addition, the operator can check a signal output from the control device 40 through a host device and determine whether or not the abnormality has been resolved in a case in which the switching circuit 74 is in the second state ST2 without disassembling the disk device 100.

According to the first embodiment, the plurality of structural elements 31p include the read head 31a that reads data recorded in the disk 20 of the disk device 100. The abnormality detecting circuit 72, the reference resistance element 73, and the switching circuit 74 are disposed at least in the read head 31a. In other words, one of the plurality of structural elements 31p is the read head 31a. For this reason, the operator performing analysis can easily determine whether an abnormality detected by the abnormality detecting circuit 72a connected to the read head 31a is in the read head 31a or the abnormality detecting circuit 72a. Thus, the number of processes required for analysis of an abnormality relating to the read head 31a among abnormalities detected by the preamplifier 50 can be reduced.

According to the first embodiment, the plurality of structural elements 31p include the write head 31b that writes data into the disk 20 of the disk device 100. The abnormality detecting circuit 72, the reference resistance element 73, and the switching circuit 74 are disposed in at least the write head 31b. In other words, one of the plurality of structural elements 31p is the write head 31b. For this reason, the operator performing analysis can easily determine whether an abnormality detected by the abnormality detecting circuit 72b connected to the write head 31b is in the write head 31b or the abnormality detecting circuit 72b. Thus, the number of processes required for analysis of an abnormality relating to the write head 31b among abnormalities detected by the preamplifier 50 can be reduced.

According to the first embodiment, the plurality of structural elements 31p include the heater 31c that is able to adjust a distance between the disk 20 of the disk device 100 and the head device 31. The abnormality detecting circuit 72, the reference resistance element 73, and the switching circuit 74 are disposed in at least the heater 31c. In other words, one of the plurality of structural elements 31p is the heater 31c. For this reason, an operator performing analysis can easily determine whether an abnormality detected by the abnormality detecting circuit 72c connected to the heater 31c is in the heater 31c or the abnormality detecting circuit 72c. Thus, the number of processes required for analysis of an abnormality relating to the heater 31c among abnormalities detected by the preamplifier 50 can be reduced.

According to the first embodiment, the plurality of structural elements 31p include the sensor 31d that is able to detect a contact between the disk 20 of the disk device 100 and the head device 31. The abnormality detecting circuit 72, the reference resistance element 73, and the switching circuit 74 are disposed in at least the sensor 31d. In other words, one of the plurality of structural elements 31p is the sensor 31d. For this reason, an operator performing analysis can easily determine whether an abnormality detected by the abnormality detecting circuit 72d connected to the sensor 31d is in the sensor 31d or the abnormality detecting circuit 72d. Thus, the number of processes required for analysis of an abnormality relating to the sensor 31d among abnormalities detected by the preamplifier 50 can be reduced.

According to the first embodiment, the plurality of structural elements 31p include the assist element 31e assisting writing of data into the disk 20 of the disk device 100. The abnormality detecting circuit 72, the reference resistance element 73, and the switching circuit 74 are disposed in at least the assist element 31e. In other words, one of the plurality of structural elements 31p is the assist element 31e. For this reason, an operator performing analysis can easily determine whether an abnormality detected by the abnormality detecting circuit 72e connected to the assist element 31e is in the assist element 31e or the abnormality detecting circuit 72e. Thus, the number of processes required for analysis of an abnormality relating to the assist element 31e among abnormalities detected by the preamplifier 50 can be reduced.

According to the first embodiment, the preamplifier 50 includes a plurality of abnormality detecting circuits 72, a plurality of reference resistance elements 73, and a plurality of switching circuits 74. The head device 31 has a plurality of structural elements 31p. The abnormality detecting circuit 72, the reference resistance element 73, and the switching circuit 74 are disposed for each of the plurality of structural elements 31p. The plurality of abnormality detecting circuit 72 are connected to the plurality of structural elements 31p respectively. The plurality of reference resistance element 73 are connected to the plurality of abnormality detecting circuits 72 respectively. Each switching circuits 74 switches each connection state between each abnormality detecting circuit 72, each structural element 31p, and each reference resistance element 73 to the first state ST1 and the second state ST2. For this reason, an operator performing analysis can easily determine whether an abnormality detected by the abnormality detecting circuit 72 connected to each of the plurality of structural elements 31p is in each structural element 31p or each abnormality detecting circuit 72. Thus, also in a case in which an abnormality relating to a certain structural element 31p among the plurality of structural elements 31p has occurred in the preamplifier 50, the number of processes required for analysis of this abnormality can be reduced.

SECOND EMBODIMENT

A second embodiment is different from the first embodiment that analysis of an abnormality detected by a preamplifier 50 is performed by a control device 40. In the second embodiment, a controller 41 of the control device 40 executes the analysis method represented in the flowchart of FIG. 6. In Step S1, when an abnormality detecting circuit 72 of the preamplifier 50 detects an abnormality, a fault signal output from the preamplifier 50 to the controller 41 becomes a signal that represents that an abnormality has been detected. The controller 41 determines that an abnormality has been detected by the preamplifier 50 on the basis of this fault signal.

After it is determined that an abnormality has been detected, the controller 41 transmits a serial signal SS to the preamplifier 50 and sets the switching circuit 74 to a second state ST2 by rewriting data of a corresponding part of a register 53 of the preamplifier 50 in Step S2. In other words, in the second embodiment, in a case in which the abnormality detecting circuit 72 has detected an abnormality in a case in which the switching circuit 74 is in a first state ST1, the controller 41 switches the switching circuit 74 to the second state ST2. In Step S2, the controller 41, for example, identifies an abnormality detecting circuit 72 that has detected an abnormality by referring to the register 53 of the preamplifier 50 and sets only the switching circuit 74 connected to this identified abnormality detecting circuit 72 to the second state ST2. In addition, in Step S2, the controller 41 may set all the switching circuits 74 to the second state ST2.

After the switching circuit 74 is set to the second state ST2, the controller 41 determines whether or not the abnormality has been resolved in Step S3. In Step S3, the controller 41 determines whether or not the abnormality detected by the preamplifier 50 has been resolved on the basis of the fault signal. In a case in which it is determined that the abnormality has been resolved in Step S3 (Step S3: Yes), the controller 41 determines that an abnormality is present in the structural element 31p (Step S4). In a case in which it is determined that the abnormality has not been resolved in Step S3 (Step S3: No), the controller 41 determines that an abnormality is present in the abnormality detecting circuit 72 (Step S5). In this way, in the second embodiment, the controller 41 of the control device 40 according to the second embodiment determines that an abnormality is present in the structural element 31p in a case in which the abnormality detecting circuit 72 has detected no abnormality in a case in which the switching circuit 74 is in the second state ST2 and determines that an abnormality is present in the abnormality detecting circuit 72 in a case in which the abnormality detecting circuit 72 has detected an abnormality in a case in which the switching circuit 74 is in the second state ST2.

After determining whether an abnormality is present in the structural element 31p or the abnormality detecting circuit 72, the controller 41 outputs an analysis result to a host device not illustrated in the drawing. The analysis result output by the controller 41 includes information representing whether an abnormality has been determined to have occurred in the structural element 31p or the abnormality detecting circuit 72, information that can be used for identifying a structural element 31p or an abnormality detecting circuit 72 in which an abnormality has been determined to have occurred, and the like. The controller 41 may output this entire analysis result to a host device or may output only a part of this analysis result to a host device. In addition, the controller 41 may not output this analysis result to a host device. The controller 41, for example, causes a storage unit such as the nonvolatile memory 43 or the like inside the control device 40 to store this analysis result. The other configurations and methods according to the second embodiment are similar to the other configurations and methods according to the first embodiment.

According to the second embodiment, the control device 40 includes the controller 41 that controls the preamplifier 50. The controller 41 is configured to switch the switching circuit 74 to the second state ST2 in a case in which the abnormality detecting circuit 72 has detected an abnormality in a case in which the switching circuit 74 is in the first state ST1. For this reason, when an abnormality has been detected by the preamplifier 50, the state of the switching circuit 74 can be automatically switched to the second state ST2 by the controller 41. In accordance with this, a person does not need to perform an operation of switching the switching circuit 74 to the second state ST2 through the controller 41. Thus, the number of processes required for analysis of an abnormality detected by the preamplifier 50 can be further reduced.

According to the second embodiment, the controller 41 is configured to: determine that an abnormality is present in the structural element 31p in a case in which the abnormality detecting circuit 72 has detected no abnormality in a case in which the switching circuit 74 is in the second state ST2, and determine that an abnormality is present in the abnormality detecting circuit 72 in a case in which the abnormality detecting circuit 72 has detected an abnormality in a case in which the switching circuit 74 is in the second state ST2. For this reason, it is automatically analyzed by the controller 41 whether an abnormality that has occurred in the preamplifier 50 is an abnormality that has occurred in the structural element 31p or the abnormality detecting circuit 72. In accordance with this, analysis of an abnormality detected by the preamplifier 50 is automatically performed without a person performing an operation. Thus, the number of processes required for analysis of an abnormality detected by the preamplifier 50 can be reduced more appropriately. In accordance with the controller 41 outputting an analysis result to a host device not illustrated in the drawing, a user and the like using the host device can acquire this analysis result. In addition, in a case in which the controller 41 stores the analysis result in a storage unit of the disk device 100, a user and the like can acquire this analysis result by accessing the storage unit of the disk device 100 through the host device or through the controller 41.

THIRD EMBODIMENT

Figure 7:
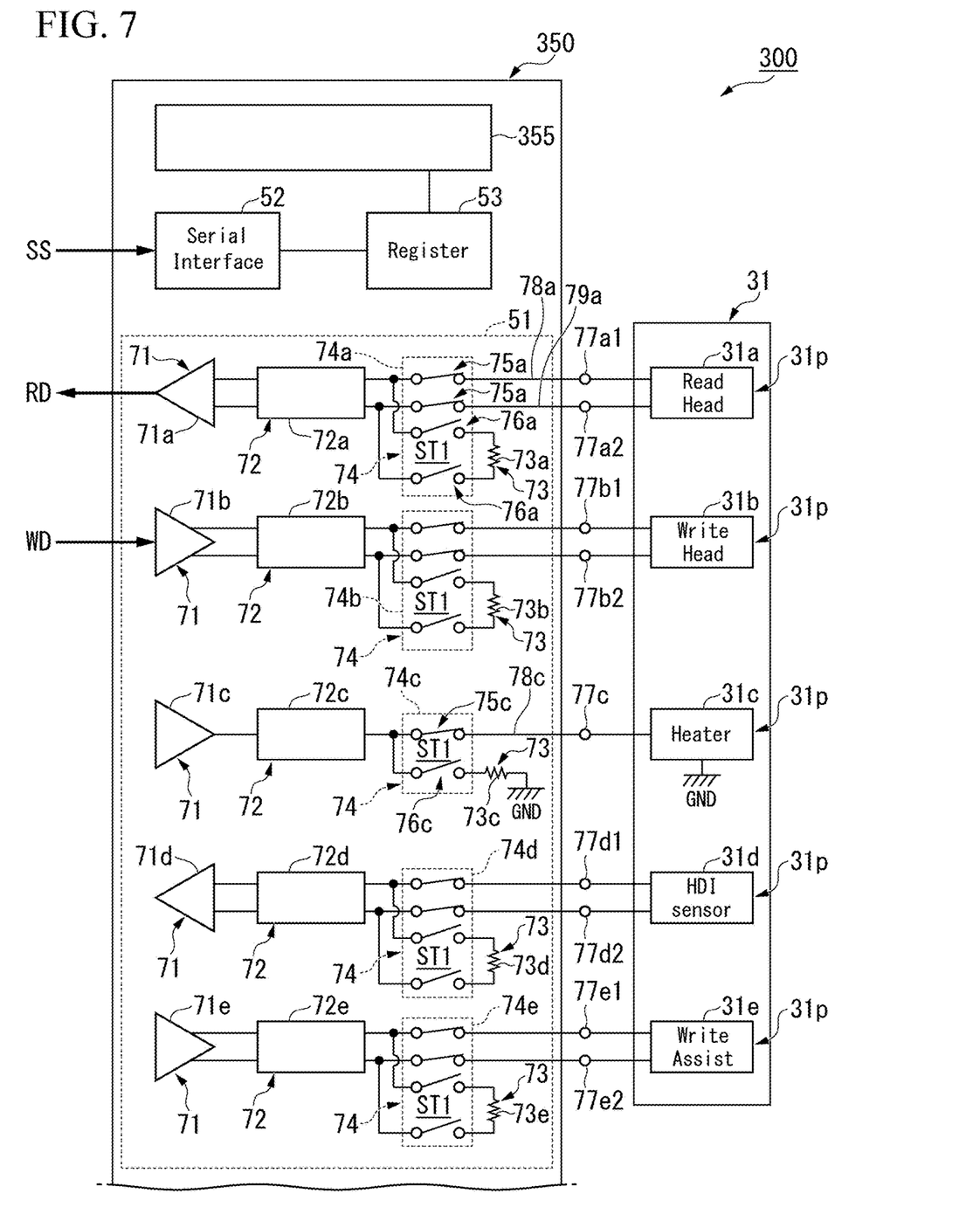
FIG. 7 is a block diagram illustrating a part of a disk device according to a third embodiment.

A third embodiment is different from the first embodiment that a preamplifier 350 includes a controller 355. FIG. 7 is a block diagram illustrating a part of a disk device 300 according to the third embodiment. In the following description, a description of configurations that are similar to those of the embodiments described above may be appropriately omitted using attachment of the same signs or the like.

As illustrated in FIG. 7, the preamplifier 350 of the disk device 300 includes the controller 355. The controller 355 can control the preamplifier 350 without using an instruction from the controller 41 of the control device 40. In the third embodiment, the controller 355 of the preamplifier 350 executes the analysis method represented in the flowchart of FIG. 6. When the abnormality detecting circuit 72 detects an abnormality in Step S1, the controller 355 receives a fault signal output from the abnormality detecting circuit 72 and determines that an abnormality has been detected.

After determining that an abnormality has been detected, the controller 355 sets the switching circuit 74 to the second state ST2 in Step S2. In other words, the controller 355 of the preamplifier 350 according to the third embodiment switches the switching circuit 74 to the second state ST2 in a case in which the abnormality detecting circuit 72 has detected an abnormality in a case in which the switching circuit 74 is in the first state ST1. The controller 355, for example, sets only the switching circuit 74 connected to the abnormality detecting circuit 72 that has output a signal indicating an abnormality to the second state ST2 in Step S2. In addition, the controller 355 may set all the switching circuits 74 to the second state ST2 in Step S2. In Step S2, the controller 355 may set the switching circuit 74 to the second state ST2 by rewriting data of a corresponding part of the register 53 or may set the switching circuit 74 to the second state ST2 by directly transmitting an instruction to the switching circuit 74 not through the register 53.

After setting the switching circuit 74 to the second state ST2, the controller 355 determines whether or not the abnormality has been resolved in Step S3. In Step S3, the controller 355 determines whether or not the abnormality detected by the abnormality detecting circuit 72 has been resolved on the basis of the fault signal. In a case in which it is determined that the abnormality has been resolved in Step S3 (Step S3: Yes), the controller 355 determines that an abnormality is present in the structural element 31p (Step S4). In a case in which it is determined that an abnormality has not been resolved in Step S3 (Step S3: No), the controller 355 determines that an abnormality is present in the abnormality detecting circuit 72 (Step S5). In this way, the controller 355 of the preamplifier 350 according to the third embodiment determines that an abnormality is present in the structural element 31p in a case in which the abnormality detecting circuit 72 has detected no abnormality in a case in which the switching circuit 74 is in the second state ST2 and determines that an abnormality is present in the abnormality detecting circuit 72 in a case in which the abnormality detecting circuit 72 has detected an abnormality in a case in which the switching circuit 74 is in the second state ST2.

After determining whether the abnormality is present in the structural element 31p or the abnormality detecting circuit 72, the controller 355 causes the register 53 to store an analysis result and outputs this analysis result to the controller 41 of the control device 40. The analysis result output by the controller 355 includes information representing whether an abnormality has been determined to have occurred in the structural element 31p or the abnormality detecting circuit 72, information that can be used for identifying a structural element 31p or an abnormality detecting circuit 72 in which an abnormality has been determined to have occurred, and the like. The controller 355 may output this entire analysis result to the controller 41 or may output only a part of this analysis result to the controller 41. In addition, the controller 355 may not output this analysis result to the controller 41. The other configurations and methods according to the third embodiment are similar to the other configurations and methods according to the second embodiment.

According to the third embodiment, the preamplifier 350 includes the controller 355. The controller 355 is configured to switch the switching circuit 74 to the second state ST2 in a case in which the abnormality detecting circuit 72 has detected an abnormality in a case in which the switching circuit 74 is in the first state ST1. For this reason, similar to the second embodiment, the state of the switching circuit 74 is can be automatically switched to the second state ST2 without a person performing an operation. Thus, the number of processes required for analysis of an abnormality detected by the preamplifier 350 can be further reduced. In addition, in a case in which an abnormality has been detected by the preamplifier 350, the state of the switching circuit 74 is switchable to the second state ST2 by the preamplifier 350 itself. In accordance with this, the switching circuit 74 can be easily switched to the second state ST2 in a short time compared to a case in which the switching circuit 74 is switched to the second state ST2 through the control device 40. In addition, by configuring such that a signal is transmitted from each abnormality detecting circuit 72 to each controller 355 in a case in which an abnormality has occurred, the controller 355 can identify an abnormality detecting circuit 72 in which an abnormality has occurred without referring to the register 53. In accordance with this, the controller 355 can easily set only the switching circuit 74 connected to the abnormality detecting circuit 72 in which an abnormality has occurred to the second state ST2 in a short time.

According to the third embodiment, the controller 355 of the preamplifier 350 is configured to: determine that an abnormality is present in the structural element 31p in a case in which the abnormality detecting circuit 72 has detected no abnormality in a case in which the switching circuit 74 is in the second state ST2, and determine that an abnormality is present in the abnormality detecting circuit 72 in a case in which the abnormality detecting circuit 72 has detected an abnormality in a case in which the switching circuit 74 is in the second state ST2. For this reason, similar to the second embodiment, analysis of an abnormality detected by the preamplifier 350 is automatically performed without a person performing an operation. Thus, the number of processes required for analysis of an abnormality detected by the preamplifier 350 can be reduced more appropriately. In addition, an abnormality can be analyzed by the preamplifier 350 itself not through the control device 40 disposed outside of the preamplifier 350. For this reason, even a disk device in which the control device 40, in which a program for analyzing an abnormality detected by the preamplifier 350 is not mounted, is mounted, can perform analysis of an abnormality using the preamplifier 350 itself. In accordance with the controller 355 outputting an analysis result to the control device 40, a user and the like using the host device can acquire this analysis result. In addition, in a case in which an analysis result of the controller 355 is only stored in the register 53, a user and the like can acquire this analysis result by referring to data of the register 53 through the controller 41 of the control device 40.

According to at least one of the embodiments described above, the preamplifier is a preamplifier that is included in a head assembly of a disk device. A preamplifier according to an embodiment includes an abnormality detecting circuit connected to a structural element included in a head device of a head assembly, a reference resistance element having a resistance value corresponding to the resistance value of the structural element and connected to the abnormality detecting circuit, and a switching circuit switchable to a first state and a second state. The first state is a state in which the abnormality detecting circuit and the structural element are connected to each other, and the abnormality detecting circuit and the reference resistance element are disconnected. The second state is a state in which the abnormality detecting circuit and the reference resistance element are connected to each other, and the abnormality detecting circuit and the structural element are disconnected. In accordance with this, in a case in which an abnormality has been detected by the preamplifier, by determining whether the abnormality has been resolved by switching the switching circuit to the second state, it can be easily determined whether the abnormality has occurred in the structural element or the abnormality detecting circuit. Thus, the number of processes required for analysis of an abnormality detected by the preamplifier can be reduced.

The switching circuit may have any configuration as long as it is switchable to the first state and the second state. The switching circuit may be a circuit that is configured using one or more transistors and other elements. The switching circuit may be configured using one or more elements other than a transistor. In a case in which the head device has a plurality of structural elements, an abnormality detecting circuit, a reference resistance element, and a switching circuit may be disposed only in a part of the plurality of structural elements. The abnormality detecting circuit may be a circuit having any configuration as long as it is able to detect an abnormality of the structural element of the head device. The resistance value of the reference resistance element is not particularly limited as long as it is a resistance value corresponding to the resistance value of the structural element of the head device.

A method for switching the switching circuit from the first state to the second state is not particularly limited. For example, a diagnosis mode may be implemented in the preamplifier. In this case, in accordance with the preamplifier coming into the diagnosis mode, the switching circuit may be switched to the second state. In the diagnosis mode, switching circuits that are switched to the second state may be either all the switching circuits or only switching circuits connected to abnormality detecting circuits in which an abnormality has been detected.

At least some of the functions of the controller of the control device and at least some of the functions of the controller of the preamplifier in the disk devices described in the embodiments described above, for example, are realized by a microprocessor executing a program, that is, software recorded in a storage unit. This program, for example, is a program causing a computer to execute the analysis method described in the embodiments described above. In addition, at least some of the functions of the controller of the control device and at least some of the functions of the controller of the preamplifier in the disk devices, for example, may be realized by hardware including circuit units such as a large scale integration (LSI), an application specific integrated circuit (ASIC), a field-programmable gate array (FPGA), and a graphics processing unit (GPU) or may be realized by software and hardware in cooperation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A preamplifier included in a head assembly of a disk device, the preamplifier comprising:
    an abnormality detecting circuit connected to a structural element included in a head device of the head assembly;
    a reference resistance element having a resistance value corresponding to a resistance value of the structural element and connected to the abnormality detecting circuit; and
    a switching circuit switchable to a first state and a second state;
    wherein the first state is a state in which the abnormality detecting circuit and the structural element are connected to each other, and the abnormality detecting circuit and the reference resistance element are disconnected, and
    wherein the second state is a state in which the abnormality detecting circuit and the reference resistance element are connected to each other, and the abnormality detecting circuit and the structural element are disconnected.

2. The preamplifier according to claim 1,
    wherein the structural element is a read head reading data recorded in a disk of the disk device.

3. The preamplifier according to claim 1,
    wherein the structural element is a write head writing data into a disk of the disk device.

4. The preamplifier according to claim 1,
    wherein the structural element is a heater that is able to adjust a distance between a disk of the disk device and the head device.

5. The preamplifier according to claim 1,
    wherein the structural element is a sensor that is able to detect a contact between a disk of the disk device and the head device.

6. The preamplifier according to claim 1,
    wherein the structural element is an assist element assisting writing of data into a disk of the disk device.

7. The preamplifier according to claim 1, comprising:
    a plurality of abnormality detecting circuits including the abnormality detecting circuit;
    a plurality of reference resistance elements including the reference resistance element; and
    a plurality of switching circuits including the switching circuit,
    wherein the head device includes a plurality of structural elements including the structural element,
    wherein the plurality of abnormality detecting circuits are connected to the plurality of structural elements respectively,
    wherein the plurality of reference resistance elements are connected to the plurality of abnormality detecting circuits respectively,
    each switching circuit switches each connection state between each abnormality detecting circuit, each structural element, and each reference resistance element to the first state and the second state.

8. The preamplifier according to claim 1, further comprising a controller, wherein the controller is configured to switch the switching circuit to the second state in a case in which the abnormality detecting circuit has detected an abnormality in a case in which the switching circuit is in the first state.

9. The preamplifier according to claim 8, wherein the controller is configured to:
    determine that an abnormality is present in the structural element in a case in which the abnormality detecting circuit has detected no abnormality in a case in which the switching circuit is in the second state, and
    determine that an abnormality is present in the abnormality detecting circuit in a case in which the abnormality detecting circuit has detected an abnormality in a case in which the switching circuit is in the second state.

10. A disk device comprising:
    a head assembly having a preamplifier;
    a casing housing the head assembly inside;

a control device controlling the preamplifier; and a connection terminal exposed to outside of the casing and electrically connected to the control device, wherein the preamplifier includes:

an abnormality detecting circuit connected to a structural element included in a head device of the head assembly;

a reference resistance element having a resistance value corresponding to a resistance value of the structural element and connected to the abnormality detecting circuit; and a switching circuit switchable to a first state and a second state;

wherein the first state is a state in which the abnormality detecting circuit and the structural element are connected to each other, and the abnormality detecting circuit and the reference resistance element are disconnected, and wherein the second state is a state in which the abnormality detecting circuit and the reference resistance element are connected to each other, and the abnormality detecting circuit and the structural element are disconnected.

11. A control device comprising a controller controlling a preamplifier included in a head assembly of a disk device, wherein the preamplifier includes: an abnormality detecting circuit connected to a structural element included in a head device of the head assembly; a reference resistance element having a resistance value corresponding to a resistance value of the structural element and connected to the abnormality detecting circuit; and a switching circuit switchable to a first state and a second state, wherein the first state is a state in which the abnormality detecting circuit and the structural element are connected to each other, and the abnormality detecting circuit and the reference resistance element are disconnected, wherein the second state is a state in which the abnormality detecting circuit and the reference resistance element are connected to each other, and the abnormality detecting circuit and the structural element are disconnected, and wherein the controller is configured to switch the switching circuit to the second state in a case in which the abnormality detecting circuit has detected an abnormality in a case in which the switching circuit is in the first state.

12. The control device according to claim 11, wherein the controller is configured to:

determine that an abnormality is present in the structural element in a case in which the abnormality detecting circuit has detected no abnormality in a case in which the switching circuit is in the second state, and determine that an abnormality is present in the abnormality detecting circuit in a case in which the abnormality detecting circuit has detected an abnormality in a case in which the switching circuit is in the second state.

13. An analysis method comprising analyzing an abnormality detected by a preamplifier included in a head assembly of a disk device, wherein the preamplifier includes: an abnormality detecting circuit connected to a structural element included in a head device of the head assembly; a reference resistance element having a resistance value corresponding to a resistance value of the structural element and connected to the abnormality detecting circuit; and a switching circuit switchable to a first state and a second state, wherein the first state is a state in which the abnormality detecting circuit and the structural element are connected to each other, and the abnormality detecting circuit and the reference resistance element are disconnected, wherein the second state is a state in which the abnormality detecting circuit and the reference resistance element are connected to each other, and the abnormality detecting circuit and the structural element are disconnected, and wherein the analyzing of the abnormality includes switching the switching circuit to the second state in a case in which the abnormality detecting circuit has detected an abnormality in a case in which the switching circuit is in the first state.

14. The analysis method according to claim 13, wherein the analyzing of the abnormality includes determining that an abnormality is present in the structural element in a case in which the abnormality detecting circuit has detected no abnormality in a case in which the switching circuit is in the second state and determining that an abnormality is present in the abnormality detecting circuit in a case in which the abnormality detecting circuit has detected an abnormality in a case in which the switching circuit is in the second state.

* * * * *